US007603620B2

(12) United States Patent
Erol et al.

(10) Patent No.: US 7,603,620 B2
(45) Date of Patent: Oct. 13, 2009

(54) CREATING VISUALIZATIONS OF DOCUMENTS

(75) Inventors: Berna Erol, Cupertino, CA (US); Kathrin Berkner, Santa Clara, CA (US)

(73) Assignee: Ricoh Co., Ltd., Tokyo (JP)

( * ) Notice: Subject to any disclaimer, the term of this patent is extended or adjusted under 35 U.S.C. 154(b) by 319 days.

(21) Appl. No.: 11/018,231

(22) Filed: Dec. 20, 2004

(65) Prior Publication Data

US 2006/0136803 A1 Jun. 22, 2006

(51) Int. Cl.
*G06F 17/00* (2006.01)
(52) U.S. Cl. ........................ 715/249; 715/201
(58) Field of Classification Search .............. 715/523, 715/513, 234, 239, 249, 201
See application file for complete search history.

(56) References Cited

U.S. PATENT DOCUMENTS

| | | | | |
|---|---|---|---|---|
| 5,761,485 | A * | 6/1998 | Munyan ..................... | 715/839 |
| 5,963,966 | A * | 10/1999 | Mitchell et al. ............ | 715/513 |
| 6,018,710 | A * | 1/2000 | Wynblatt et al. ........... | 704/260 |
| 6,349,132 | B1 * | 2/2002 | Wesemann et al. ....... | 379/88.17 |
| 6,862,713 | B1 * | 3/2005 | Kraft et al. ................. | 715/728 |
| 6,924,904 | B2 * | 8/2005 | Stevens et al. ............. | 358/1.18 |
| 6,970,602 | B1 * | 11/2005 | Smith et al. ................ | 382/232 |
| 7,020,839 | B1 * | 3/2006 | Hosoda ...................... | 715/523 |
| 2002/0073119 | A1 * | 6/2002 | Richard ..................... | 707/513 |
| 2002/0184111 | A1 * | 12/2002 | Swanson .................... | 705/26 |
| 2004/0230570 | A1 * | 11/2004 | Hatta et al. ................. | 707/3 |
| 2005/0246375 | A1 * | 11/2005 | Manders et al. ........ | 707/104.1 |

OTHER PUBLICATIONS

Rollins, Sami, et al, "Wireless and Mobile Networks Performance: Power-Aware Data Management for Small Devices", Proceedings of the 5th ACM International Workshop on Wireless Mobile Multimedia WOWMOM '02, Sep. 2002, pp. 80-89.*
Hexel, Rene, et al, "PowerPoint to the People: Suiting teh Word to the Audience", Proceedings of the Fifth Conference on Australasian User Interface—vol. 28 AUIC '04, Jan. 2004, pp. 49-56.*
Muer, O. Le, et al, "Performance Assessment of a Visual Attention System Entirely Based on a Human Vision Modeling," 4 pages.
Matsuo, Y., et al, "Keyword Extraction from a Single Document using Word Co-occurrence Statistical Information," International Journal on Artificial Intelligence Tools, Jul. 13, 2003, 13 pages.
Fukumoto, Fumiyo, et al, "An Automatic Extraction of Key Paragraphs Based on Context Dependency," pp. 291-298.
Aiello, Marco, et al, "Document understanding for a broad class of documents," IJDAR (2002) 5, pp. 1-16.

* cited by examiner

*Primary Examiner*—Laurie Ries
(74) *Attorney, Agent, or Firm*—Blakely, Sokoloff, Taylor & Zafman LLP

(57) ABSTRACT

A method, apparatus and article of manufacture for creating visualization of documents. In one embodiment, the method comprises identifying document information associated with a document and converting the document information to one or more constrained time-based media channels.

55 Claims, 5 Drawing Sheets

CREATING VISUALIZATIONS OF DOCUMENTS

FIELD OF THE INVENTION

The present invention is related to processing and presenting documents; more particularly, the present invention is related to composing a document in such a way as to have audible and/or visual information in the document identified and have audible information synthesized to play when displaying a representation of a portion of the document.

BACKGROUND OF THE INVENTION

With the increased ubiquity of wireless networks, mobile work, and personal mobile devices, more people browse and view web pages, photos, and even documents using small displays and limited input peripherals. One current solution for web page viewing using small displays is to design simpler, low-graphic versions of web pages. Photo browsing problems are also partially solved by simply showing a low resolution version of photos and giving the user the ability to zoom in and scroll particular areas of each photo.

Browsing and viewing documents, on the other hand, is a much more challenging problem. Documents may be multipage, have a much higher resolution than photos (requiring much more zooming and scrolling at the user's side in order to observe the content), and have highly distributed information (e.g., focus points on a photo may be only a few people's faces or an object in focus where a typical document may contain many focus points, such as title, authors, abstract, figures, references). The problem with viewing and browsing documents is partially solved for desktop and laptop displays by the use of document viewers and browsers, such as Acrobat and MSWord. These allow zooming in a document, switching between document pages, and scrolling thumbnail overviews. Such highly interactive processes can be acceptable for desktop applications, but considering that mobile devices (e.g., phones and PDAs) have limited input peripherals, with limited input and even smaller displays, a better solution for document browsing and viewing is needed for document browsing on these devices.

Ricoh Innovations of Menlo Park, Calif. developed a technology referred to herein as SmartNail Technology. SmartNail Technology creates an alternative image representation adapted to given display size constraints. SmartNail processing may include three steps: (1) an image analysis step to locate image segments and attach a resolution and importance attribute to them, (2) a layout determination step to select visual content in the output thumbnail, and (3) a composition step to create the final SmartNail image via cropping, scaling, and pasting of selected image segments. The input, as well as the output of SmartNail processing, is a still image. All information processed during the three steps results in static visual information. For more information, see U.S. patent application Ser. No. 10/354,811, entitled "Reformatting Documents Using Document Analysis Information," filed Jan. 29, 2003, published Jul. 29, 2004 (Publication No. US 2004/0146199 A1) and U.S. patent application Ser. No. 10/435,300, entitled "Resolution Sensitive Layout of Document Regions," filed May 9, 2003, published Jul. 29, 2004 (Publication No. US 2004/0145593 A1).

Web page summarization, in general, is well-known in the prior art to provide a summary of a webpage. However, the techniques to perform web page summarization are heavily focused on text and usually does not introduce new channels (e.g., audio) that are not used in the original web page. Exceptions include where audio is used in browsing for blind people as is described below and in U.S. Pat. No. 6,249,808.

Maderlechner et al. discloses first surveying users for important document features, such as white space, letter height, etc and then developing an attention based document model where they automatically segment high attention regions of documents. They then highlight these regions (e.g., making these regions print darker and the other regions more transparent) to help the user browse documents more effectively. For more information, see Maderlechner et al., "Information Extraction from Document Images using Attention Based Layout Segmentation," Proceedings of DLIA, pp. 216-219, 1999.

At least one technique in the prior art is for non-interactive picture browsing on mobile devices. This technique finds salient, face and text regions on a picture automatically and then uses zoom and pan motions on this picture to automatically provide close ups to the viewer. The method focuses on representing images such as photos, not document images. Thus, the method is image-based only, and does not involve an audio for image thumbnails. For more information, see Wang et al., "MobiPicture—Browsing Pictures on Mobile Devices," ACM MM'03, Berkeley, November 2003 and Fan et al., "Visual Attention Based Image Browsing on Mobile Devices," International Conference on Multimedia and Exp, vol. 1, pp. 53-56, Baltimore, Md., July 2003.

Conversion of documents to audio in the prior art mostly focuses on aiding visually impaired people. For example, Adobe provides a plug-in to Acrobat reader that synthesizes PDF documents to speech. For more information, see Adobe, PDF access for visually impaired, http://www.adobe.com/support/salesdocs/10446.htm. Guidelines are available on how to create an audiocassette from a document for blind or visually impaired people. As a general rule, information that is included in tables or picture captions is included in the audio cassette. Graphics in general should be omitted. For more information, see "Human Resources Toolbox," Mobility International USA, 2002, www.miusa.org/publications/Hrtoolboxintro.htm. Some work has been done on developing a browser for blind and visually impaired users. One technique maps a graphical HTML document into a 3D virtual sound space environment, where non-speech auditory cures differentiate HTML documents. For more information, see Roth et al., "Auditory browser for blind and visually impaired users." CHI'99, Pittsburgh, Pa., May 1999. In all the applications for blind or visually impaired users, the goal appears to be transforming as much information as possible into the audio channel without having necessarily constraints on the channel and giving up on the visually channel completely.

Other prior art techniques for use in conversion of messages includes U.S. Pat. No. 6,249,808, entitled "Wireless Delivery of Message Using Combination of Text and Voice," issued Jun. 19, 2001. As described therein, in order for a user to receive a voicemail on a handheld device, a voicemail message is converted into a formatted audio voicemail message and formatted text message. The portion of the message that is converted to text fills the available screen on the handheld device, while the remainder of the message is set as audio.

SUMMARY OF THE INVENTION

A method, apparatus and article of manufacture for creating visualization of documents. In one embodiment, the method comprises identifying document information associated with a document and converting the document information to one or more constrained time-based media channels.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Figure 1:
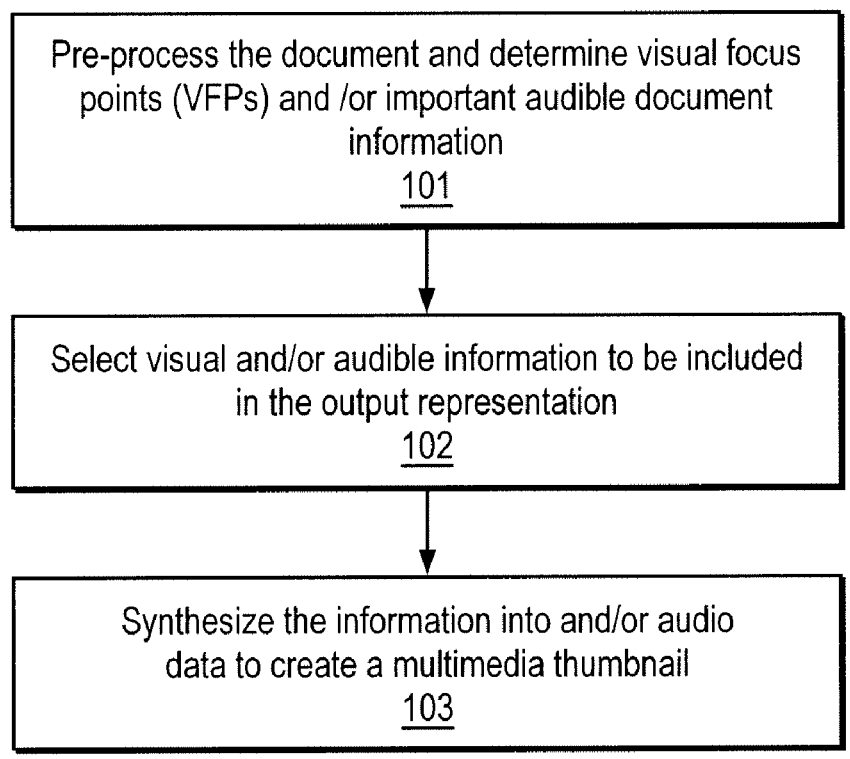
FIG. 1 is a flow diagram of one embodiment of a process for generating multimedia overviews of documents.

A method and apparatus for generating multimedia overviews of documents, referred to herein as Multimedia Thumbnails (MMNails), are described. In one embodiment, MMNails contain the most important visual and audible (e.g., keywords) elements of a document and present these elements in both the spatial domain and the time dimension. An MMNail results from analyzing, selecting and synthesizing information considering constraints given by the output device (e.g., size of display, limited image rendering capability) or constraints on an application (e.g., limited time span for playing audio).

In one embodiment, the multimedia overview generation process includes extracting multimedia information from still image documents (visual and audible), assigning of importance and time attributes to visual and audible information segments, and optimizing multimedia information for visual and audio channels given device and application constraints. Thus, MMNails use both channels. Depending on the device or user preference, one of the two channels may be preferred over the other. As a result, MMNails utilize both the visual and audio channel of the device to present an overview of the document in a limited display and in a limited time-frame, and reduce, and potentially minimize, the interaction required by the user. In contrast to prior art approaches, the original document may be a still image with no multimedia content attached.

In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a flow diagram of one embodiment of a process for generating multimedia overviews of documents. The process is performed by processing logic that may comprise hardware (e.g., circuitry, dedicated logic, etc.), software (such as is run on a general purpose computer system or a dedicated machine), or a combination of both.

Referring to FIG. 1, using an electronic version of a document (not necessarily containing video or audio data) and its metadata, the process begins by processing logic pre-processing the document and/or its metadata and determining visual focus points (VFPs) and/or important audible document information (ADIs) (processing block 101).

Given the VFPs and the ADI, along with device and application constraints (e.g., display size, a time constraint), processing logic multimedia selects visual and/or audible information to be included in the output representation (e.g., a multimedia thumbnail) (processing block 102). In one embodiment, the selection is optimized to include the preferred visual and audible information in the output representation, where preferred information may include important information in the document, user preferred, important visual information (e.g., figures), important semantic information (e.g., title), key paragraphs (output of a semantic analysis), document context. Important information may include resolution sensitive areas of a document.

After selection, processing logic synthesizes the information into visual data (for the visual channel, or representation) and/or audio data (for the audio channel, or representation) to create a multimedia thumbnail (processing block 103). Thus, a thumbnail, in this context, may refer to a representation in which material from the document is presented visually and audibly.

Figure 2:
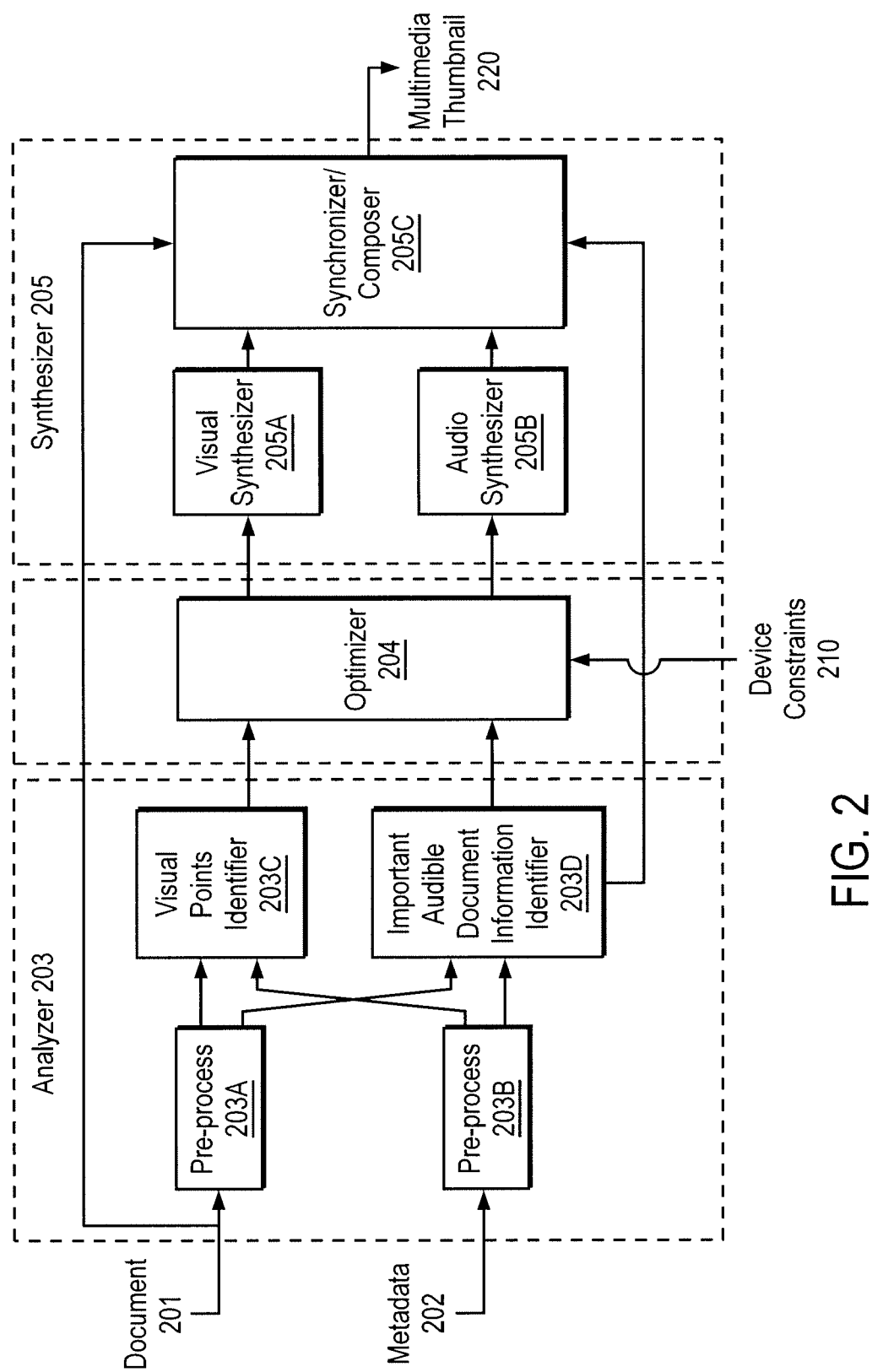
FIG. 2 is a flow diagram of another embodiment of processing components for generating multimedia overviews of documents.

FIG. 2 is a flow diagram of another embodiment of processing components for generating multimedia overviews of documents. In one embodiment, each of the modules comprises hardware (e.g., circuitry, dedicated logic, etc.), software (such as is run on a general purpose computer system or a dedicated machine), or a combination of both.

Referring to FIG. 2, analyzer 203 receives document 201 and metadata 202. Metadata 202 may include author information and creation data, text (e.g., in a pdf file format where the text may be metadata and is overlayed with the document image), an audio or video stream, URLs, publication name, date, place, access information, encryption information, image and scan resolution, MPEG-7 descriptors etc. In response to these inputs, analyzer 203 performs pre-processing on these inputs and generates outputs information indicative of one or more visual focus points in document 101 along with information indicative of audible information in the document. The audible information may be information that is important in document 201 and/or metadata 202.

In one embodiment, analyzer 203 comprises document pre-processing unit 203A, metadata pre-processing unit 203B, visual focus points identifier 203C, and important audible document information identifies 203D. In one embodiment, document pre-processing unit 203A performs one or more of optical character recognition (OCR), layout analysis and extraction, JPEG 2000 compression and header extraction, document flow analysis, font extraction, face detection and recognition, graphics extraction, and music notes recognition, which is performed depending on the application. In one embodiment, document pre-processing unit 203A includes Expervision OCR software to perform layout analysis on characters and generates bounding boxes and associated attributes, such as font size and type. In another embodiment, bounding boxes of text zones and associated attributes are generated using ScanSoft software. In another embodiment, a semantic analysis of the text zone is performed in the manner described in Aiello M., Monz, C., Todoran, L., Worring, M., "Document Understanding for a Broad Class of Documents," International Journal on Document Analysis and Recognition (IJDAR), vol. 5(1), pp. 1-16, 2002, to determine semantic attributes such as, for example, title, heading, footer, and figure caption.

Metadata pre-processing unit 203B may perform parsing and content gathering. For example, in one embodiment, metadata preprocessing unit 203B, given an author's name as metadata, extracts the author's picture from the world wide web (WWW) (which can be included in the MMNail later). In one embodiment, metadata pre-processing unit 203B performs XML parsing.

After pre-processing, visual focus points identifier 203C determines and extracts visual focus segments, while important audible document information identifier 103D determines and extracts important audible data.

In one embodiment, visual focus points identifier 203C identifies visual focus points based on OCR and layout analysis results from pre-processing unit 203A and/or XML parsing results from pre-processing unit 203B.

In one embodiment, visual focus points identifier 203C performs analysis techniques set forth in U.S. patent application Ser. No. 10/435,300, entitled "Resolution Sensitive Layout of Document Regions," filed May 9, 2003, published Jul. 29, 2004 (Publication No. US 2004/0145593 A1) to identify text zones and attributes (e.g., importance and resolution attributes) associated therewith. Text zones, may include a title and captions, which are interpreted as segments. In one embodiment, visual focus points identifier 203C determines the title and figures as well. In one embodiment, figures are segmented.

In one embodiment, audible document information identifier 203D identifies audible information in response to OCR and layout analysis results from pre-processing unit 203A and/or XML parsing results from pre-processing unit 203B.

Examples of visual focus segments include figures, titles, text in large fonts, pictures with people in them, etc. Note that these visual focus points may be application dependent. Also, attributes such as resolution and saliency attributes are associated with this data. The resolution may be specified as metadata. In one embodiment, these visual focus segments are determined in the same fashion as specified in U.S. patent application Ser. No. 10/435,300, entitled "Resolution Sensitive Layout of Document Regions," filed May 9, 2003, published Jul. 29, 2004 (Publication No. US 2004/0145593 A1). In another embodiment, the visual focus segments are determined in the same manner as described in Le Meur, O., Le Callet, P., Barba, D., Thoreau, D., "Performance assessment of a visual attention system entirely based on a human vision modeling," Proceedings of ICIP 2004, Singapore, pp. 2327-2330, 2004. Saliency may depend on the type of visual segment (e.g., text with large fonts may be more important than text with small fonts, or vice versa depending on the application). The importance of these segments may be empirically determined for each application prior to MMNail generation. For example, an empirical study may find that the faces in figures and small text are the most important visual points in an application where the user assess the scan quality of a document. The salient points can also be found by using one of the document and image analysis techniques in the prior art.

Examples of audible information include titles, figure captions, keywords, and parsed meta data. Attributes, e.g., importance (saliency) and time attributes (duration after synthesizing to speech) are also attached to the audible information. Importance of audible segments may depend on its type. For example, an empirical study may show that the document title and figure captions are the most important audible information in a document for a "document summary application".

Some attributes of VFPs and ADIs can be assigned using cross analysis. For example, the time attribute of a figure (VFP) can be assigned to be the same as the time attribute of the figure caption (ADI)).

In one embodiment, audible document information identifier 203D performs Term Frequency-Inverse Document Frequency (TFIDF) analysis to automatically determine keywords based on frequency, such as described in Matsuo, Y., Ishizuka, M." Keyword Extraction from a Single Document using Word Co-occurrence Statistical Information, International Journal on Artificial Intelligence Tools, vol.13, no.1, pp. 157-169, 2004 or key paragraphs as in Fukumoto, F., Suzuki, Y., Fukumoto, J., "An Automatic Extraction of Key Paragraphs Based on Context Dependency," Proceedings of Fifth Conference on Applied Natural Language Processing, pp. 291-298, 1997. For each keyword, audible document information identifier 203D computes a time attribute as being the time it takes for a synthesizer to speak that keyword. In one embodiment, the time is computed by multiplying the number of characters by a speech-synthesizing constant, SSC. Instead of figuring out audio time for each word, an approximation for this time is generated by having a constant SSC that is multiplied by the number of characters. SSC may be found by feeding a test text document, which has $C_n$ number of characters, to the synthesizer, measuring the time, $T_{audio}$, that is required to play back the synthesized audio and dividing this time by the number of characters, $SSC=T_{audio}/C_n$. The SSC constant may change depending on the language choice, synthesizer that is used and the synthesizer options (female vs male voice, accent type, talk speed, etc).

In a similar fashion, audible document information identifier 203D computes time attributes for selected text zones, such as, for example, title, headings, and figure captions. Each time attribute is correlated with its corresponding segment. For example, the figure caption time attribute is also correlated with the corresponding figure segment. In one embodiment, each audible information segment also carries an importance attribute that may reflect the visual importance (based on font size and position on a page) or reading order in case of text zone, the frequency of appearance in the case of keywords, or the visual importance attribute for figures and related figure captions. In one embodiment, the importance attribute is calculated in the same way as described in U.S. patent application Ser. No. 10/435,300, entitled "Resolution Sensitive Layout of Document Regions," filed May 9, 2003, published Jul. 29, 2004 (Publication No. US 2004/0145593 A1).

The visual focus segments and important audible information are output to optimizer 204.

Optimizer 204 receives the output from analyzer 203, which includes the characterization of the visual and audible document information, and device characteristics, or one or more constraints (e.g., display size, available time span, user settings preference, and power capability of the device), and computes a combination of visual and audible information that meets the device constraints and utilizes the capacity of information deliverable through the available output visual and audio channels. In this way, optimizer 204 operates as a selector, or selection mechanism.

In one embodiment, in response to visual and audible information segments from analyzer 203 and other inputs such as the display size of the output device and the time span, L, which is the duration of final multimedia thumbnail, optimizer 204 performs an optimization algorithm. In one embodiment, given display resolution and multimedia thumbnail length L, the following pseudo-code is applied by optimizer 204:

image resolution=display resolution
nof_page_flip=L/0.5;
remainder_T=L−nof_doc_pages×0.5
If (remainder_T<=0) goto END
First_page_hold=1; //in seconds
remainder_T=remainder_T−First_page_hold;
If (remainder_T<=0) goto END
Zoom_to_title=2; //time to zoom and hold the title
remainder_T=remainder_T−Zoom_to_title;
If (remainder_T<=0) goto END
Sort figure captions based on the time attributes (from short to long)
Do linear packing given remainder_T constraint
Sort keywords based on their TFIDF scores (from high to low)
Do linear packing of keywords based on their time attributes given First_page_hold+Zoom_to_title
time constraint
END Re-sort information to preserve the reading order The main function of the optimization algorithm is to first determine how many pages can be shown to the user, given each page is to be displayed on the display for 0.5 second, during the time span available. If the time left from the time span L is large enough after displaying each page, optimizer 204 allocates time for zooming on the title of the document. If the visual information channel is completely occupied during this time, the only other choice for information delivery is the audio channel, which is used by synthesized speech of keywords. If the time span for "reading" keywords is limited, a selection of the keyword list is performed following the keyword importance values, i.e. sorting the keyword list with respect to importance and computing the cut off after one or more keywords by optimizing the filling of the one-dimensional time span interval via a linear packing/filling order approach applied to the keywords' time attributes.

If there is any time left after page flipping through the pages and title zooming, optimizer 204 sorts the captions of the figures based on their time attribute (duration when their captions are synthesized to speech) to fill the remaining available time.

In one embodiment, optimizer 204 then applies a linear packing/filling order approach in a manner well-known in the art to the sorted time attributes to select which figures will be included in the multimedia thumbnail. Still-image holding is applied to the selected figures of the document. During the occupation of the visual channel by image holding, the caption is "spoken" in the audio channel. After optimization, optimizer 204 re-orders the selected visual and audio segments with respect to the reading order.

Other optimizers may be used to maximize the joined communicated information in time span L and in the visual display of constrained size.

Synthesizer 205 composes the final multimedia thumbnail. In one embodiment, synthesizer 205 composes the final multimedia thumbnail by executing selected multimedia processing steps determined in optimizer 204. In one embodiment, synthesizer 205 receives a file, such as, for example, a plain text file or XML file, having the list of processing steps. In another embodiment, the list of processing steps may be sent to synthesizer 205 by some other means such as, for example, through socket communication or corn object communication between two software modules. In yet another embodiment, the list of processing steps is passed as function parameters if both modules are in the same software. The multimedia processing steps may include the "traditional" image processing steps crop, scale, and paste, but also steps including a time component such as page flipping, pan, zoom, and speech & music synthesis.

In one embodiment, synthesizer 205 comprises visual synthesizer 205A, audio synthesizer 205B, and synthesizer/composer 205C. Synthesizer 205 uses visual synthesis 205A to synthesize the selected visual information into images and sequence of images, audio synthesizer 205B to synthesize audible information into speech, and then synchronizer/composer 205C to synchronize the two output channels (audio and visual) and compose multimedia thumbnail 220. In one embodiment, for the visual composition including sequences of images (without audio) such as zoom and page flipping is performed using Adobe AfterEffects, while synchronizer/composer 205C uses Adobe Premier. In one embodiment, audio synthesizer 205B uses CMU speech synthesizing software (FestVox http://festvox.org/voicedemos.html) to create sound for the audible information.

In one embodiment, synthesizer 205 does not include synchronizer/composer 205C. In such a case, the output of synthesizer 205 may be output as two separate streams, one for audio and one for visual.

The outputs of synchronizer/composer 205C may be combined into a single file and may be separate audio and video channels.

Figure 3:
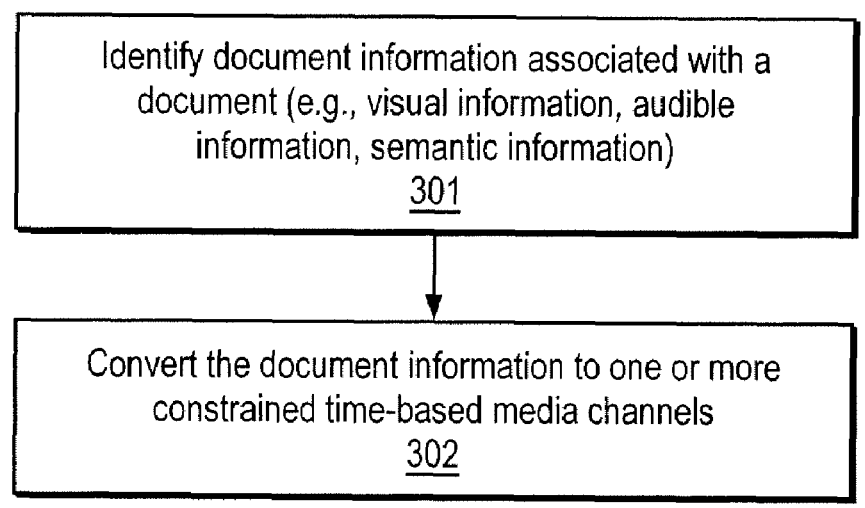
FIG. 3 is a flow diagram of another embodiment of a process for processing documents.

FIG. 3 is a flow diagram of another embodiment of a process for processing documents. The process of FIG. 3 is performed by processing logic which may comprise hardware (e.g., circuitry, dedicated logic, etc.), software (such as is run on a general purpose computer system or a dedicated machine), or a combination of both. Referring to FIG. 3, processing begins by processing logic identifying document information associated with a document (e.g., visual information, audible information, semantic information, etc.) (processing block 301). After identifying the document information, processing logic converts the document information to information for one or more constrained time-based media channels (processing block 302). In one embodiment, these media channels may be a visual channel, an audio channel, or a combination of both.

Applications

The techniques described herein may be potentially useful for a number of applications. For example, the techniques may be used for document browsing for devices, such as mobile devices and multi-function peripherals (MFPs).

For example, when performing interactive document browsing on a mobile device, the document browsing can be re-defined, for example, instead of zoom and scroll, operations may include, play, pause, fast forward, speedup, and slowdown.

In another mobile device application when performing document viewing and reviewing on mobile devices, the techniques set forth herein may be used to allow a longer version of the MMNail (e.g., 15 minutes long) to be used to provide not only an overview but also understand the content of a document. This application seems to be suitable for devices with limited imaging capabilities, but preferred audio capability, such as cell phones. After browsing and viewing a document with a mobile device, in one embodiment, the mobile device sends it to a device (e.g., an MFP) at another location to have the device perform other functions on the document (e.g., print the document).

In one MFP application, the techniques described herein may be used for document overview. For example, when a user is copying some documents at the MFP, as the pages are scanned, an automatically computed document overview may be displayed to the user, giving a person a head start in understanding the content of the document.

An image processing algorithm performing enhancement of the document image inside an MFP may detect regions of problematic quality, such as low contrast, small font, halftone screen with characteristics interfering with the scan resolution, etc. An MMNail may be displayed on the copier display (possibly without audio) in order to have the user evaluating the quality of the scanned document (i.e., the scan quality) and suggest different settings, e.g., higher contrast, higher resolution.

Figure 4:
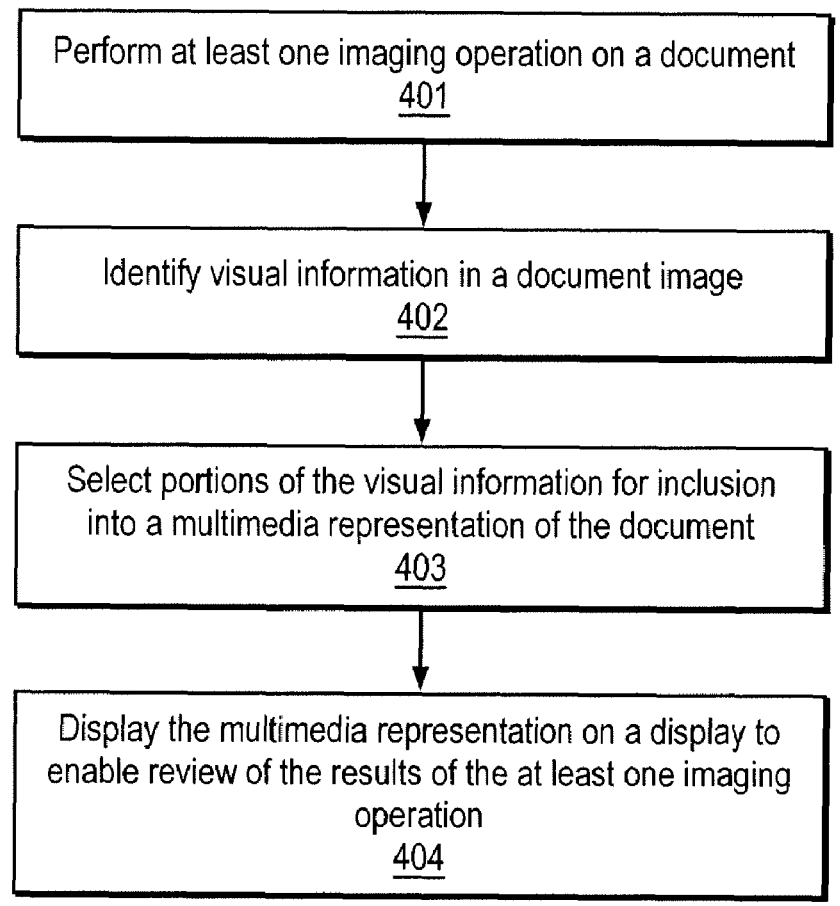
FIG. 4 is a flow diagram of one embodiment of a process for performing document processing to enable review of results of one or more imaging operations.

FIG. 4 is a flow diagram of one embodiment of a process for performing document processing. The process may be performed by a processing logic that comprises hardware (e.g., circuitry, dedicated logic, etc.), software (such as is run on a general purpose computer system or a dedicated machine), or a combination of both. Referring to FIG. 4, the process begins by processing logic performing at least one imaging operation (e.g., scanning) on a document (processing block 401). After performing any imaging operations, processing logic identifies visual information in the document image. In one embodiment, processing logic identifies visual information by detecting regions of problematic quality. Regions of problematic quality may include, for example, regions that have low contrast, small font, and a halftone screen characteristic that interferes with scan resolution. In another embodiment, the processing logic identifies visual information in the document by identifying resolution sensitive portions of an image.

After identifying visual information, processing logic selects portions of the visual information for inclusion into a multi-media representation of the document (processing block 403). In one embodiment, where processing logic identifies resolution sensitive portions of the image, processing logic selects the portions by zooming in, panning or titling the resolution sensitive portions.

After selecting portions, processing logic displays the multimedia representation on a display to enable the review of the results of any imaging operation (processing block 404). In one embodiment, after displaying the multimedia representation, processing logic receives an input to modify application of the imaging operation.

In a Translation Application, the language for the audio channel can be selected by the user and audible information may be presented in language of choice. In this case, the optimizer functions differently for different languages since the length of the audio would be different. That is, the optimizer results depend on the language. In one embodiment, visual document text is altered. The visual document portion can be re-rendered in a different language.

In one embodiment, the MMNail optimizations are computed on the fly, based on interactions provided by user. For example, if the user closes the audio channel, then other visual information may lead to different visual representation to accommodate this loss of information channel. In another example, if the user slows downs the visual channel (e.g., while driving a car), information delivered through the audio channel may be altered. Also, animation effects such as, for example, zoom and pan, may be available based on the computational constraints of the viewing device.

In one embodiment, the MMnails are used to assist disabled people in perceiving document information. For example, visual impaired people may want to have small text in the form of audible information. In another example, color blind people may want some information on colors in a document be available as audible information in the audio channel.

An Exemplary Computer System

Figure 5:
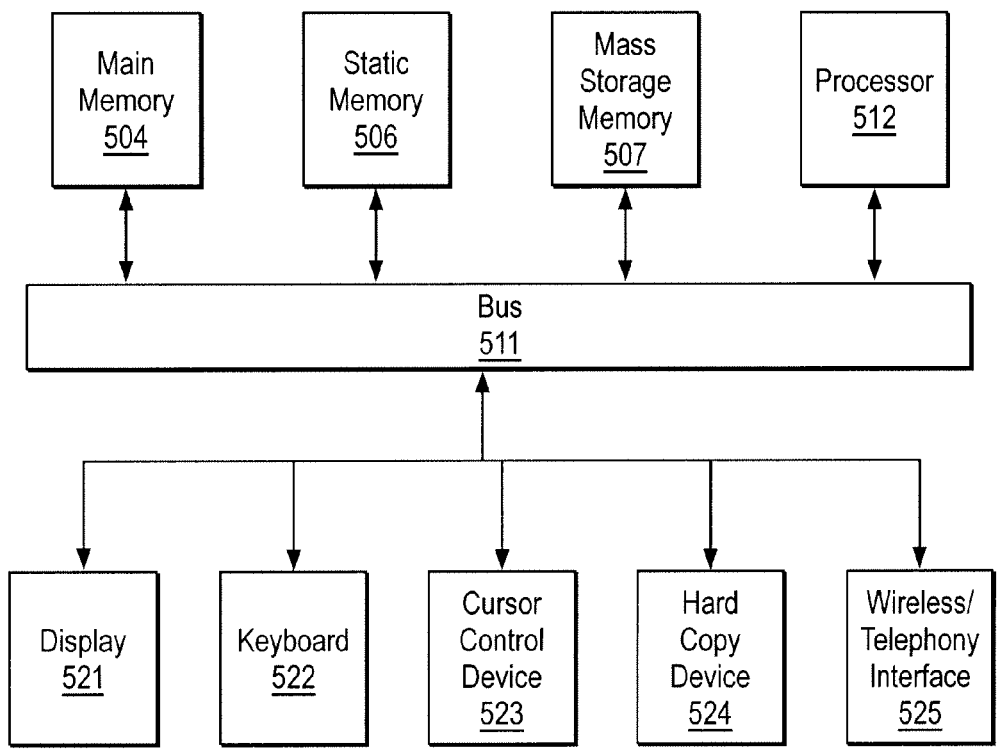
FIG. 5 is a block diagram of one embodiment of a computer system.

FIG. 5 is a block diagram of an exemplary computer system that may perform one or more of the operations described herein. Referring to FIG. 5, computer system 500 may comprise an exemplary client or server computer system. Computer system 500 comprises a communication mechanism or bus 511 for communicating information, and a processor 512 coupled with bus 511 for processing information. Processor 512 includes a microprocessor, but is not limited to a microprocessor, such as, for example, Pentium Processor, etc.

System 500 further comprises a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also comprises a read only memory (ROM) and/or other static storage device 506 coupled to bus 511 for storing static information and instructions for processor 512, and a data storage device 507, such as a magnetic disk or optical disk and its corresponding disk drive. Data storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, trackpad, stylus, or cursor direction keys, coupled to bus 511 for communicating direction information and command selections to processor 512, and for controlling cursor movement on display 521.

Another device that may be coupled to bus 511 is hard copy device 524, which may be used for printing instructions, data, or other information on a medium such as paper, film, or similar types of media. Furthermore, a sound recording and playback device, such as a speaker and/or microphone may optionally be coupled to bus 511 for audio interfacing with computer system 500. Another device that may be coupled to bus 511 is a wired/wireless communication capability 525 to communication to a phone or handheld palm device.

Note that any or all of the components of system 500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

The invention claimed is:

1. A method comprising:
    identifying, at a computer system, visual information in a document;
    identifying, at the computer system, audible information from the document that is convertible to audio based at least on results of layout analysis of the document;
    converting, at the computer system, at least one audible information element of the identified audible information to audio, wherein at least one audible information element converted to audio is new audio data and is associated with a portion of visual information indentified in the document;
    selecting, at the computer system, portions of the visual information and audible information, including the new audio data and associated visual information, for inclusion into a multimedia representation of the document; and
    composing, at the computer system, the multimedia representation with the audio based on selected audible information with selected visual information, so that audio is synchronized with corresponding selected visual information during presentation of the visual information in the multimedia representation, wherein the new audio data is synchronized to at least a portion of time the portion of associated visual in formation is being shown.

2. The method defined in claim 1 wherein selecting portions of the visual information and audible information is selected based on one or more constraints.

3. The method defined in claim 2 wherein one constraint is display size of a device for which the multimedia representation is being generated.

4. The method defined in claim 2 wherein one constraint is length of time for the audio.

5. The method defined in claim 2 wherein one constraint is length of time for the longest of all video and audio channels.

6. The method defined in claim 2 wherein one constraint is length of time for the multimedia representation.

7. The method defined in claim 1 further comprising synchronizing the audio based on time attributes associated with the selected audible information and the selected visual information as part of the multimedia representation.

8. The method defined in claim 1 wherein selecting portions of the visual information and audible information for inclusion into a multimedia representation of the document occurs based on one or more characteristics associated with a device upon which the multimedia thumbnail is to be presented.

9. The method defined in claim 8 wherein the one or more characteristics comprises one or more from a group consisting of display size, available time span, power capability, device IDs, user settings of the device.

10. The method defined in claim 1 wherein selecting portions of the visual information and audible information for inclusion into a multimedia representation of the document comprises selecting a combination of visual and audible information to meet device constraints while maximizing information deliverable through the device during a predetermined time span.

11. The method defined in claim 1 wherein selecting portions of the visual information and audible information for inclusion into a multimedia representation of the document comprises:
    determining a number of pages of the document to display during a time span when each page is displayed for a predetermined period of time;
    determining whether enough time exists in the time span to display one or more of a group consisting of a title and a keyword; and
    selecting audible information in the document to be synthesized into speech.

12. The method defined in claim 1 wherein the visual information comprises one or more visual focus points in the document.

13. The method defined in claim 12 wherein the one or more visual focus points include one or more of a group consisting of a title, figures, problematic image quality regions, abstract, author's names, references, figure captions.

14. The method defined in claim 1 wherein identifying audible information from the document that is convertible to audio comprises identifying one or more keywords in the document and associating an attribute with each identified keyword.

15. The method defined in claim 14 wherein the attribute is a time attribute.

16. The method defined in claim 14 wherein identifying one or more keywords in the document is performed using TFIDF.

17. The method defined in claim 1 wherein identifying audible information from the document that is convertible to audio comprises identifying one or more key paragraphs in the document and associating an attribute with each identified key paragraph.

18. The method defined in claim 1 wherein identifying audible information from the document that is convertible to audio comprises identifying one or more figure captions in the document and associating an attribute with each identified keyword.

19. The method defined in claim 18 wherein the attribute is a time attribute.

20. The method defined in claim 1 wherein identifying audible information from the document that is convertible to audio is based on results of preprocessing metadata associated with the document.

21. The method defined in claim 1 wherein identifying audible information from the document that is convertible to audio is based on results of layout analysis of the document and of pre-processing metadata associated with the document.

22. The method defined in claim 1 wherein identifying visual information from the document is based on results of layout analysis of the document.

23. The method defined in claim 1 wherein identifying visual information from the document is based on results of pre-processing metadata associated with the document.

24. The method defined in claim 1 wherein identifying visual information from the document is based on results of results of layout analysis of the document and of pre-processing metadata associated with the document.

25. An apparatus comprising:
a memory to store a document; and
a processor coupled to the memory to cause
an analyzer to identify visual information in the document and identify audible information from the document that is convertible to audio, wherein indentifying audible information identified from the document that is convertible to audio is based at least on results of layout analysis of the document, wherein at least one identified audible information element will be converted to new audio data and associated with a portion of visual information in the document,
a selector to select portions of the visual information and audible information, including the at least one audible information element that is convertible to audio and associated visual information, for inclusion into a multimedia representation of the document, and
a synthesizer to compose the multimedia representation with audio based on selected audible information synchronized with selected visual information, so that audio is synchronized with corresponding selected visual information during presentation of the visual information in the multimedia representation, wherein the new audio data is synchronized to at least a portion of time the portion of associated visual information is being shown.

26. The apparatus defined in claim 25 wherein the analyzer comprises a visual information identifier to identify the visual information in the document; and an audible document information identifier to identify the audible information from the document and metadata associated with the document.

27. The apparatus defined in claim 26 wherein the visual information identifier identifies visual focus points in the document.

28. The apparatus defined in claim 27 wherein the visual focus points comprise one or more page thumbnails, a title and one or more figures in the document, if any.

29. The apparatus defined in claim 26 wherein audible information identifier determines one or more keywords and a time attribute for at least one of the one or more keywords.

30. The apparatus defined in claim 29 wherein the audible information identifier identifies the one or more keywords with TFIDF.

31. The apparatus defined in claim 26 wherein audible information identifier determines one or more figure captions and a time attribute for at least one of the one or more figure captions.

32. The apparatus defined in claim 26 wherein the audible document information identifier identifies audible information from the document that is convertible to audio by identifying one or more keywords in the document and associating an attribute with each identified keyword.

33. The apparatus defined in claim 32 wherein the attribute is a time attribute.

34. The apparatus defined in claim 32 wherein the audible document information identifier identifies one or more keywords in the document using TFIDF.

35. The apparatus defined in claim 26 wherein the audible document information identifier identifies audible information from the document that is convertible to audio by identifying one or more figure captions in the document and associating an attribute with each identified keyword.

36. The method defined in claim 35 wherein the attribute is a time attribute.

37. The apparatus defined in claim 26 further comprising:
a document pre-processing unit to provide layout information to both the visual information identifier and the audible document information identifier.

38. The apparatus defined in claim 37 wherein the visual information identifier identifies visual information from the document based on results of layout analysis of the document obtained from the document pre-processing unit.

39. The apparatus defined in claim 37 wherein the document preprocessing unit performs optical character recognition on the document to produce recognition results and performs layout analysis on the recognition results to produce an indication of text zones and one or more attributes associated with each of the text zones.

40. The apparatus defined in claim 37 further comprising a metadata pre-processing unit to pre-process metadata associated with the document to produce metadata pre-processing results, and further wherein the visual information identifier and the audible document information identifier are responsive to the metadata pre-processing results.

41. The apparatus defined in claim 40 wherein the metadata preprocessing unit performs XML parsing.

42. The apparatus defined in claim 40 wherein the audible information identifier identifies audible information from the document that is convertible to audio is based on results of layout analysis of the document and of pre-processing metadata associated with the document.

43. The apparatus defined in claim 40 wherein the visual information identifier identifies visual information from the document is based on results of pre-processing metadata associated with the document.

44. The apparatus defined in claim 40 wherein the visual information identifier identifies visual information from the document is based on results of layout analysis of the document and of pre-processing metadata associated with the document.

45. The apparatus defined in claim 40 wherein the document preprocessing unit and the metadata pre-processing unit are a single unit.

46. The apparatus defined in claim 25 wherein the synthesizer comprises:
 a visual synthesizer to create visual output information from the selected visual information;
 an audio synthesizer to synthesize audio from the selected audible information; and
 a composer to generate the multimedia thumbnail in response to outputs from the visual synthesizer and the audio synthesizer.

47. The apparatus defined in claim 46 wherein the synthesizer further comprises a synchronizer to synchronize the audio based on time attributes associated with the selected audible information and the selected visual information.

48. The apparatus defined in claim 25 wherein the selector selects portions of the visual information and audible information is selected based on one or more constraints.

49. The apparatus defined in claim 48 wherein one constraint is display size of a device for which the multimedia representation is being generated.

50. The apparatus defined in claim 48 wherein one constraint is length of time for the audio.

51. The apparatus defined in claim 25 wherein the selector selects portions of the visual information and audible information for inclusion into a multimedia representation of the document occurs based on one or more characteristics associated with a device upon which the multimedia thumbnail is to be presented.

52. The apparatus defined in claim 51 wherein the one or more characteristics comprises one or more from a group consisting of display size, available time span, power capability of the device.

53. The apparatus defined in claim 25 wherein the selector selects portions of the visual information and audible information for inclusion into a multimedia representation of the document comprises selecting a combination of visual and audible information to meet device constraints while maximizing information deliverable through the device during a predetermined time span.

54. The apparatus defined in claim 25 wherein the selector selects portions of the visual information and audible information for inclusion into a multimedia representation of the document by:
 determining a number of pages of the document to display during a time span when each page is displayed for a predetermined period of time;
 determining whether enough time exists in the time span to display one or more of a group consisting of a title and a keyword; and
 selecting audible information in the document to be synthesized into speech.

55. An article of manufacture having one or more recordable media with instructions thereon which, when executed by a system, cause the system to perform a method comprising:
 identifying visual information in a document;
 identifying audible information from the document that is convertible to audio based at least on results of layout analysis of the document;
 converting at least one audible information element of the identified audible information to audio, wherein at least one audible information element converted to audio is new audio data and is associated with a portion of visual information indentified in the document;
 selecting portions of the visual information and audible information, including the new audio data and associated visual information, for inclusion into a multimedia representation of the document; and
 composing the multimedia representation with the audio based on selected audible information with selected visual information, so that audio is synchronized with corresponding selected visual information during presentation of the visual information in the multimedia representation, wherein the new audio data is synchronized to at least a portion of time the portion of associated visual information is being shown.

* * * * *

UNITED STATES PATENT AND TRADEMARK OFFICE
CERTIFICATE OF CORRECTION

| | | |
|---|---|---|
| PATENT NO. | : 7,603,620 B2 | Page 1 of 1 |
| APPLICATION NO. | : 11/018231 | |
| DATED | : October 13, 2009 | |
| INVENTOR(S) | : Erol et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Fifth Day of October, 2010

David J. Kappos
*Director of the United States Patent and Trademark Office*